United States Patent
Toksvig et al.

(10) Patent No.: US 7,408,553 B1
(45) Date of Patent: Aug. 5, 2008

(54) INSIDE TESTING FOR PATHS

(75) Inventors: Michael J. M. Toksvig, Palo Alto, CA (US); Edward A. Hutchins, Mountain View, CA (US); Brian Cabral, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 44 days.

(21) Appl. No.: 11/305,483

(22) Filed: Dec. 15, 2005

(51) Int. Cl.
*G06T 11/40* (2006.01)

(52) U.S. Cl. ........................ 345/441; 345/423
(58) Field of Classification Search ................. 345/418, 345/619, 423, 441
See application file for complete search history.

(56) References Cited

U.S. PATENT DOCUMENTS

| | | | | |
|---|---|---|---|---|
| 4,687,326 A * | 8/1987 | Corby, Jr. | .................. | 365/5.01 |
| 4,727,471 A * | 2/1988 | Driels et al. | .................. | 700/66 |
| 4,899,318 A * | 2/1990 | Schlumberger et al. | ......... | 367/8 |
| 5,442,733 A * | 8/1995 | Kaufman et al. | ............. | 345/424 |
| 5,487,172 A * | 1/1996 | Hyatt | .......................... | 712/32 |
| 5,550,933 A * | 8/1996 | Stetten | ........................ | 382/199 |
| 5,647,018 A * | 7/1997 | Benjamin | .................... | 382/128 |
| 5,659,671 A * | 8/1997 | Tannenbaum et al. | ........ | 345/426 |
| 5,774,133 A * | 6/1998 | Neave et al. | ................. | 345/505 |
| 5,877,768 A * | 3/1999 | Jain | ............................ | 345/421 |
| 5,880,736 A * | 3/1999 | Peercy et al. | ................. | 345/426 |
| 5,949,424 A * | 9/1999 | Cabral et al. | ................. | 345/426 |
| 6,023,279 A * | 2/2000 | Sowizral et al. | ............. | 345/421 |
| 6,046,744 A * | 4/2000 | Hoppe | .......................... | 345/426 |
| 6,057,852 A * | 5/2000 | Krech, Jr. | .................... | 345/589 |
| 6,163,319 A * | 12/2000 | Peercy et al. | ................. | 345/426 |
| 6,172,679 B1 * | 1/2001 | Lim | ............................ | 345/421 |
| 6,222,937 B1 * | 4/2001 | Cohen et al. | ................. | 382/154 |
| 6,226,005 B1 * | 5/2001 | Laferriere | .................... | 345/426 |
| 6,249,287 B1 * | 6/2001 | Yamrom | ..................... | 345/419 |
| 6,266,064 B1 * | 7/2001 | Snyder | ........................ | 345/421 |
| 6,292,192 B1 * | 9/2001 | Moreton | ..................... | 345/586 |
| 6,307,555 B1 * | 10/2001 | Lee | ............................ | 345/423 |
| 6,587,104 B1 * | 7/2003 | Hoppe | ........................ | 345/423 |
| 6,621,925 B1 * | 9/2003 | Ohmori et al. | .............. | 382/167 |
| 6,668,082 B1 * | 12/2003 | Davison et al. | ............. | 382/190 |
| 6,687,396 B1 * | 2/2004 | Sugiura et al. | .............. | 382/141 |
| 6,828,985 B1 * | 12/2004 | Long et al. | .................. | 345/620 |
| 2002/0118875 A1 * | 8/2002 | Wilensky | ..................... | 382/173 |

(Continued)

OTHER PUBLICATIONS

Using lattice for web-based medical applications Akira Wakita, Takamichi Hayashi, Takashi Kanai, Hiroaki Chiyokura, Feb. 2001 Proceedings of the sixth international conference on 3D Web technology Web3D '01.*

(Continued)

*Primary Examiner*—Javid A Amini
(74) *Attorney, Agent, or Firm*—Patterson & Sheridan, LLP

(57) ABSTRACT

Systems and methods for identifying pixels that are inside a two-dimensional path may be used to fill the path. The path is segmented and a point in space is identified that is used to generate a triangle fan, where each triangle in the fan is formed by one of the segments of the path and the point. Locations in a winding buffer are updated for each pixel that is within a triangle of the triangle fan. The resulting winding buffer indicates the pixels that are inside the two-dimensional path. The winding buffer may be used to fill the path.

20 Claims, 12 Drawing Sheets

U.S. PATENT DOCUMENTS

2003/0183692 A1* 10/2003 Dickson et al. .............. 235/454
2004/0257607 A1* 12/2004 Gupta et al. ................ 358/1.15
2005/0280648 A1* 12/2005 Wang et al. .................. 345/420
2007/0047790 A1*  3/2007 Dewaele ...................... 382/128

OTHER PUBLICATIONS

Fast exact and approximate geodesics on meshes Vitaly Surazhsky, Tatiana Surazhsky, Danil Kirsanov, Steven J. Gortler, Hugues Hoppe Jul. 2005 ACM Transactions on Graphics (TOG), ACM SIGGRAPH 2005 Papers SIGGRAPH '05, vol. 24 Issue 3.*

Surface simplification using quadric error metrics Michael Garland, Paul S. Heckbert ; Aug. 1997.*

Fast and memory efficient polygonal simplification Peter Lindstrom, Greg Turk; Oct. 1998.*

Progressive meshes Hugues Hoppe; Aug. 1996.*

Simplification envelopes Jonathan Cohen, Amitabh Varshney, Dinesh Manocha, Greg Turk, Hans Weber, Pankaj Agarwal, Frederick Brooks, William Wright ; Aug. 1996.*

Controlled simplification of genus for polygonal models Jihad El-Sana, Amitabh Varshney ; Oct. 1997.*

Texture Mapping Progressive Meshes, Progressive hull; Texture creation; Silhouette extraction; Stencil setting . . . Coarse hull. Progressive hull. Progressive mesh sequence; Every mesh encloses . . . cs.harvard.edu/~sjg/extra/silclip_siggraph2000.ppt.*

Texture mapping progressive meshes Pedro V. Sander, John Snyder, Steven J. Gortler, Hugues Hoppe Aug. 2001 Proceedings of the 28th annual conference on Computer graphics and interactive techniques SIGGRAPH '01 Publisher: ACM Press.*

Neider et al., "Drawing Filled, Concave Polygons Using the Stencil Buffer", The Official Guide to Learning OpenGL, Release 1, Chapter 13, pp. 12-14, 1994, http://fly.cc.fer.hr/~unreal/theredbook/chapter13.html.

* cited by examiner

INSIDE TESTING FOR PATHS

BACKGROUND OF THE INVENTION

1. Field of the Invention

Embodiments of the present invention generally relate to determining pixels that are inside a two-dimensional path and, more specifically, to producing a winding buffer that indicates whether each pixel is inside of or outside of the two-dimensional path.

2. Description of the Related Art

Conventionally a two-dimensional path is triangulated in order to fill the pixels that are inside the path. Triangulation is a computationally intensive process that is typically performed on a general purpose processor. The resulting triangles may be filled by a two-dimensional processing engine in order to offload the general purpose processor.

Accordingly, it is desirable to use techniques other than triangulation to determine the pixels that are inside of the two-dimensional path in order to offload the general purpose processor and improve system performance for filling the two-dimensional path.

SUMMARY OF THE INVENTION

The current invention involves new systems and methods for identifying pixels that are inside a two-dimensional path. The path is segmented and a point in space is identified that is used to generate a triangle fan, where each triangle in the fan is formed by one of the segments of the path and the point. Locations in a winding buffer are updated for each pixel that is within a triangle of the triangle fan. The resulting winding buffer indicates the pixels that are inside the two-dimensional path. The winding buffer may be used to fill the path.

Various embodiments of the invention set forth a method for identifying pixels that are inside a path to produce a winding buffer include segmenting the path into a set of segments that approximate the path, identifying a point in space, forming a triangle including a first segment of the set of segments as a first edge, including a second edge formed by the point in space and a first endpoint of the first segment, including a third edge formed by the point in space and a second endpoint of the first segment, and determining a winding direction of the triangle.

Various embodiments of the invention set forth a system for shading pixels that are inside a path that includes a rasterizer, a fragment processing pipeline, and a memory. The rasterizer is configured to rasterize pixels within a triangle bounded by a segment of the path and a point in space and determine a winding direction of the triangle. The fragment processing pipeline is coupled to the rasterizer and is configured to update the winding buffer based on the winding direction of the triangle and configured to read the winding buffer and shade the pixels that are inside of the path. The memory is coupled to the fragment processing pipeline and configured to store a winding buffer that indicates the pixels that are inside of the path.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Systems and methods for identifying pixels that are inside a two-dimensional path may be used to fill the path. The path is segmented and a point in space is identified that is used to generate a triangle fan, where each triangle in the fan is formed by one of the segments of the path and the point. Graphics processing engines typically used for processing three-dimensional primitives may be used to rasterize the triangle fan and determine the winding direction, e.g., front-facing, backfacing, clockwise, counter-clockwise, or the like, of each triangle in the fan. Locations in a winding buffer are updated for each pixel that is within a triangle of the triangle fan. The resulting winding buffer indicates the pixels that are inside the two-dimensional path. The winding buffer may be used to fill the path. The processing workload may be divided between a host processor and a graphics processor to improve the overall system performance for filling two-dimensional paths. For example, the host processor may perform segmentation of the path and the graphics processor may identify pixels that are inside of the path and shade those pixels.

Figure 1A:
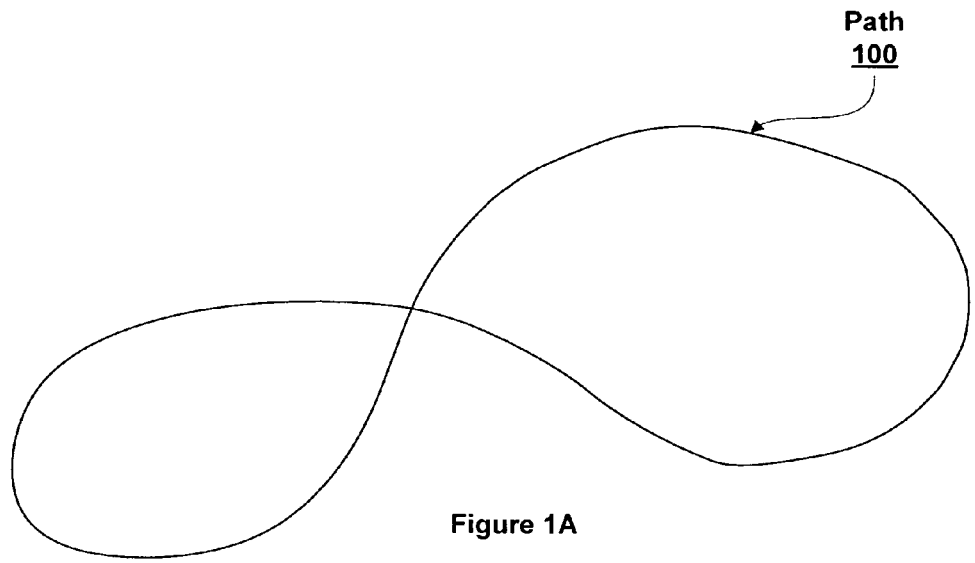
FIG. 1A illustrates a two-dimensional path in accordance with one or more aspects of the present invention.
Figure 1B:
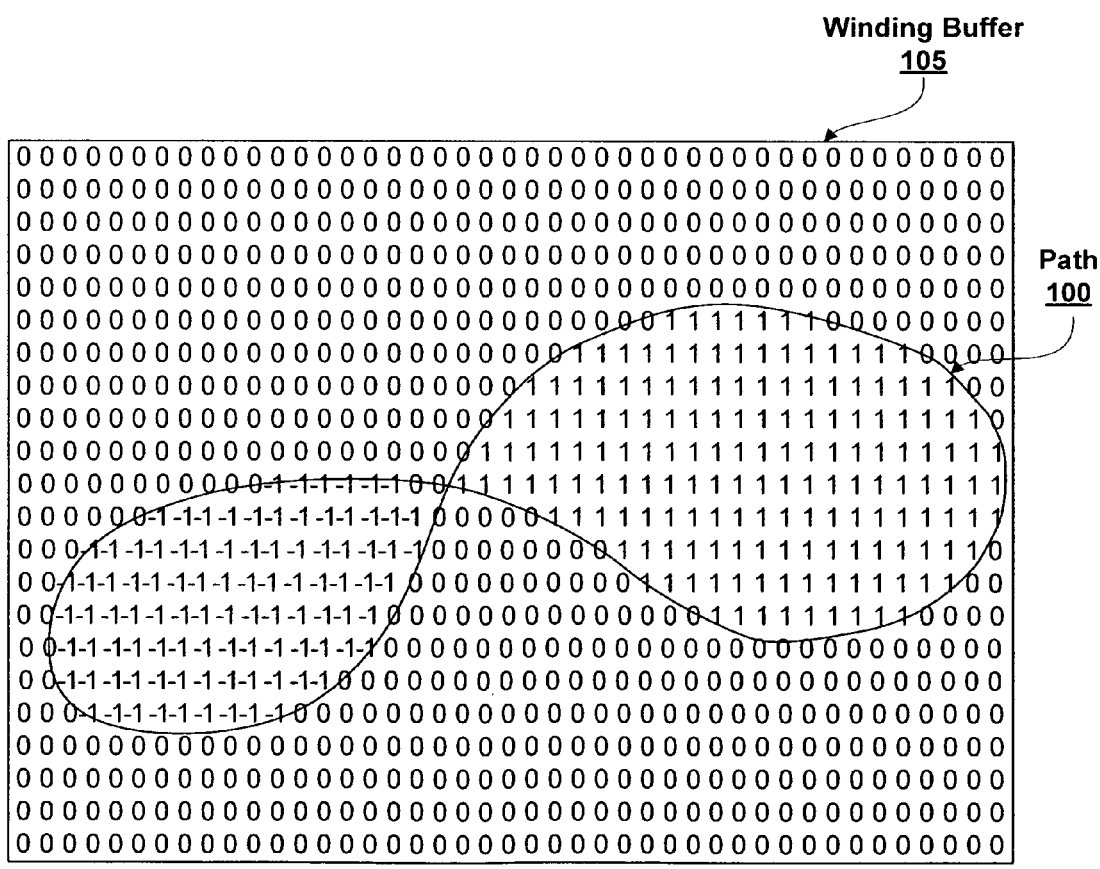
FIG. 1B illustrates a winding buffer corresponding to the two-dimensional path of FIG. 1A in accordance with one or more aspects of the present invention.

FIG. 1A illustrates a two-dimensional path, path 100, in accordance with one or more aspects of the present invention. The path is closed and may be self-intersecting. In order to fill the path, the pixels that are inside the path should be identified. FIG. 1B illustrates a winding buffer, winding buffer 105, that corresponds to the two-dimensional path of FIG. 1A, path 100, in accordance with one or more aspects of the present invention. Path 100 is superimposed on winding buffer 105 in FIG. 1B in order to illustrate that the contents of winding buffer 105 correspond to path 100.

Winding buffer 105 may be produced by a graphics processor or a general purpose processor, e.g., host processor, central processing unit (CPU), or the like, and stored in memory. Winding buffer 105 includes a location corresponding to each pixel in the target image. Each location stores a value that is at least one bit in size. Winding buffer 105 identifies the pixels that are inside of path 100. Specifically, any pixel location that stores a non-zero value is inside of path 100. Methods of the present invention that may be used to produce winding buffer 105 are described in conjunction with FIGS. 3A, 3C, and 5. In other embodiments of the present invention, the winding buffer stores only a single bit for each pixel and the pixel locations store either a 0 or 1. A method of the present invention that may be used to produce a winding buffer with a single bit for each pixel is described in conjunction with FIG. 2B.

Figure 1C:
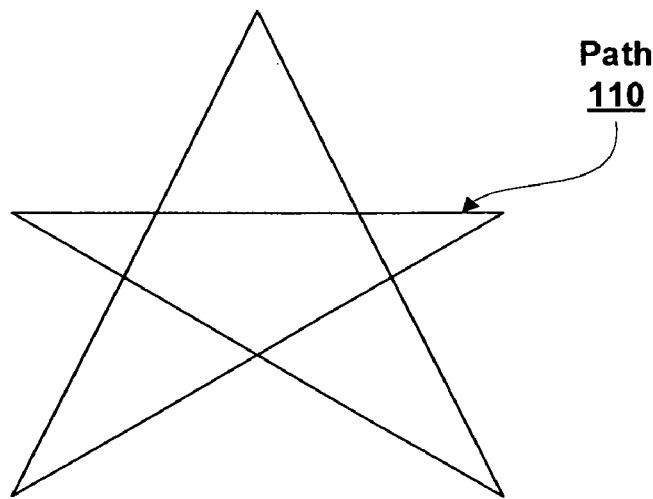
FIG. 1C illustrates another two-dimensional path in accordance with one or more aspects of the present invention.
Figure 1D:
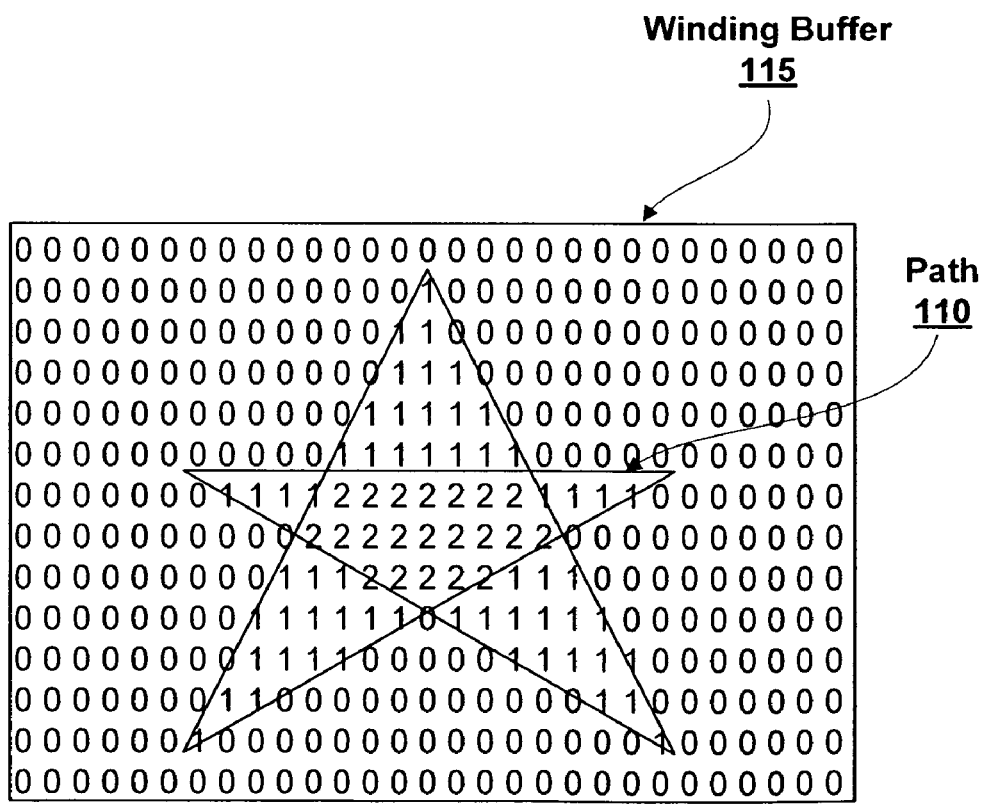
FIG. 1D illustrates a winding buffer corresponding to the two-dimensional path of FIG. 1C in accordance with one or more aspects of the present invention.

FIG. 1C illustrates another two-dimensional path, path 110, in accordance with one or more aspects of the present invention. FIG. 1D illustrates a winding buffer, winding buffer 115, corresponding to the two-dimensional path of FIG. 1C, path 110, in accordance with one or more aspects of the present invention. Path 110 is superimposed on winding buffer 115 in FIG. 1B in order to illustrate that the contents of winding buffer 115 correspond to path 110.

Like winding buffer 105, winding buffer 105 may also be produced by a graphics processor or a general purpose processor and stored in memory. Winding buffer 115 includes a location corresponding to each pixel in the target image. Any pixel location of winding buffer 115 that stores a non-zero value is inside of path 110. Methods of the present invention that may be used to produce winding buffer 115 are described in conjunction with FIGS. 3A, 3C, and 5. The pixels that are inside of path 110 may be shaded dependent on a fill mode, e.g., odd/even or non-zero. For example, all non-zero value pixels may be shaded to fill the entire path or all pixels with odd values may be shaded to fill path 110, leaving the center portion of path 115 (that corresponds to pixel values of 2) unshaded.

Figure 2A:
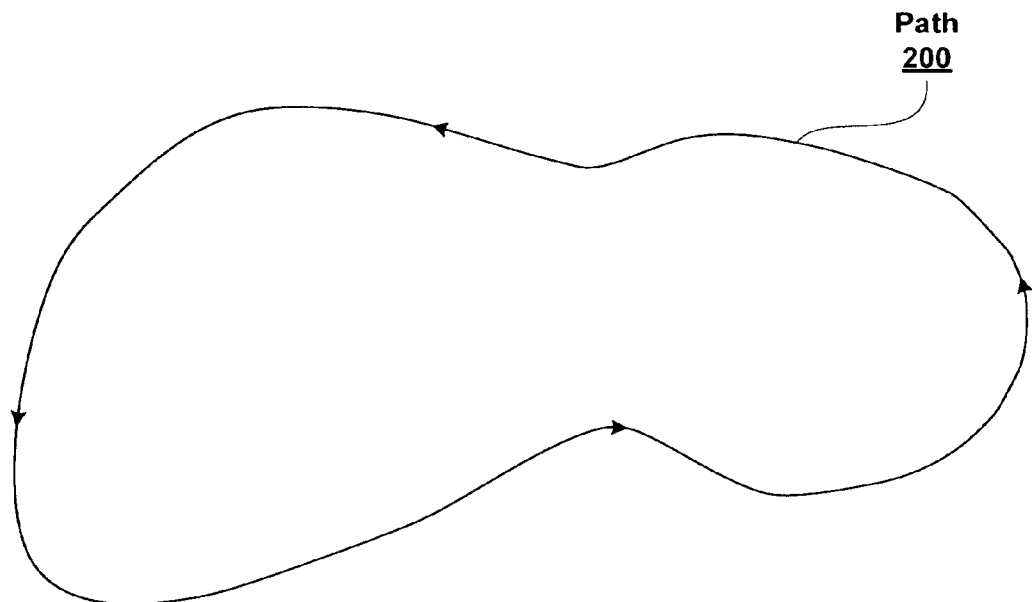
FIG. 2A illustrates a two-dimensional path with arrows indicating the direction of the path in accordance with one or more aspects of the present invention.
Figure 2B:
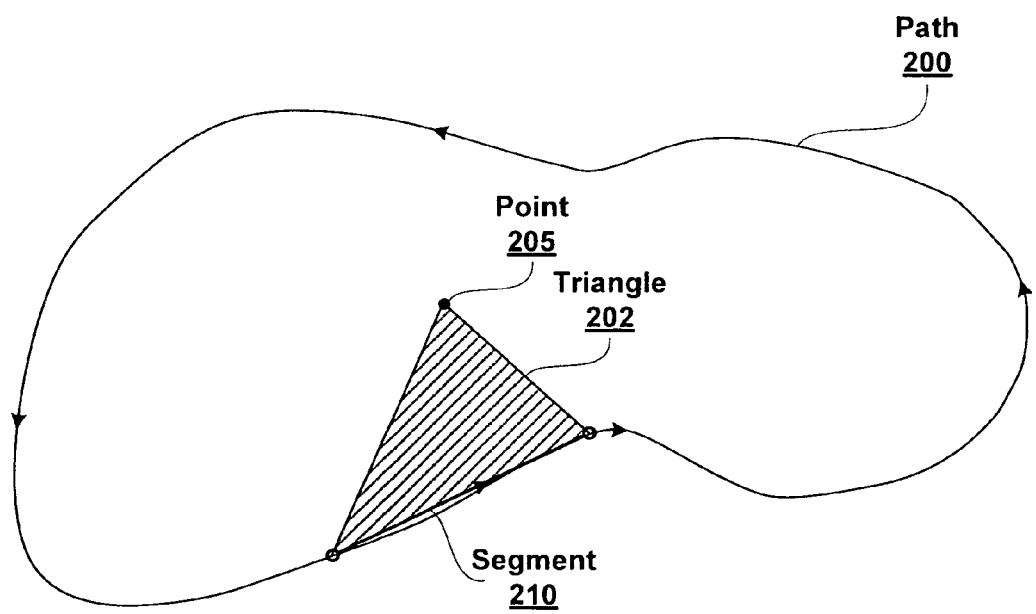
FIG. 2B illustrates the two-dimensional path of FIG. 2A including a segment and point within the path that form a triangle in accordance with one or more aspects of the present invention.

FIG. 2A illustrates a two-dimensional path, path 200, with arrows indicating the direction of the path in accordance with one or more aspects of the present invention. FIG. 2B illustrates two-dimensional path 200 of FIG. 2A including a segment, segment 210, and a point in space in accordance with one or more aspects of the present invention. The point in space, point 205, is within path 200. Segment 210 is produced when path 200 is segmented into a set of line segments that approximate path 200. Segment 210 and point 205 form a triangle, triangle 202. A winding direction of triangle 202 is determined based on the direction of segment 210. The winding direction of triangle 202 is the same as the winding direction of path 200, counter-clockwise (frontfacing).

Conventionally, a general purpose processor may be used to generate non-overlapping triangles to completely fill a path, such as path 200. Generating the non-overlapping triangles is a computationally intensive task. When the techniques of the present invention are used, the general purpose processor may instead, segment the path and produce a set of connected segments that approximate the path. Performing segmentation instead of triangulation reduces the computational workload performed by the general purpose processor and may improve overall system performance. A graphics processor may be used to determine the pixels that are inside of the segmented path and fill those pixels.

Figure 2C:
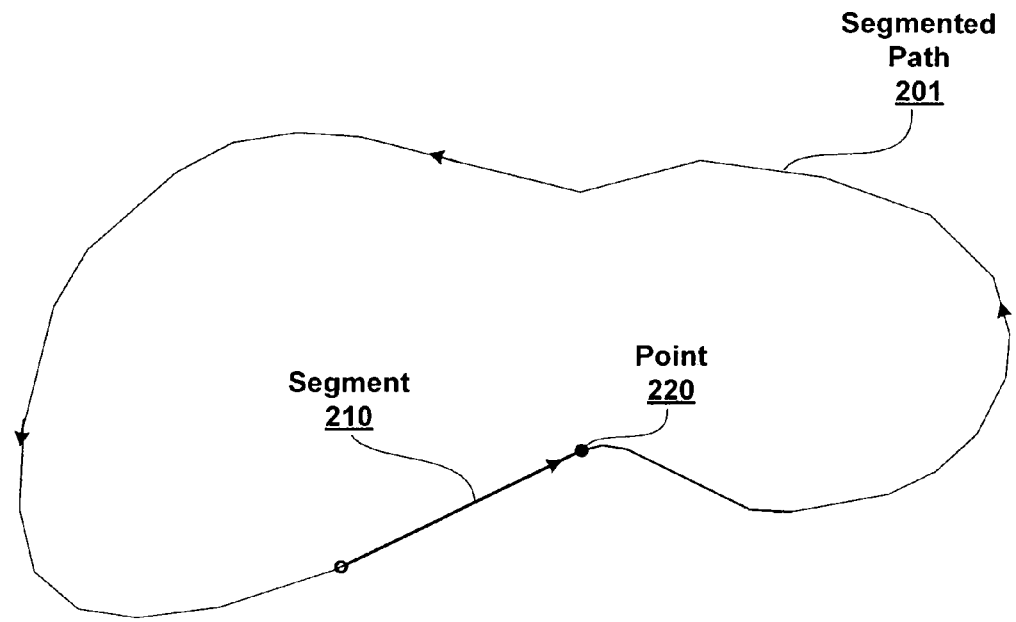
FIGS. 2C and 2D illustrate the two-dimensional path of FIG. 2A that has been segmented in accordance with one or more aspects of the present invention.

FIG. 2C illustrates a segmented path, segmented path 201 that approximates path 200 of FIG. 2A in accordance with one or more aspects of the present invention. Segmented path 202 includes a segment 210. A point in space, point 220 is positioned along segmented path 201. Specifically, point 220, is coincident with an endpoint of segment 210. A triangle fan may be generated to produce a triangle for each segment of segmented path 202 and point 220. Like a triangle fan that is produced using point 205 of FIG. 2B, all of the triangles in a triangle fan produced using point 220 will be within segmented path 201. A winding buffer may be produced by using the triangle fan, as described in conjunction with FIGS. 3A, 3B, 3C, and FIG. 5.

Figure 2D:
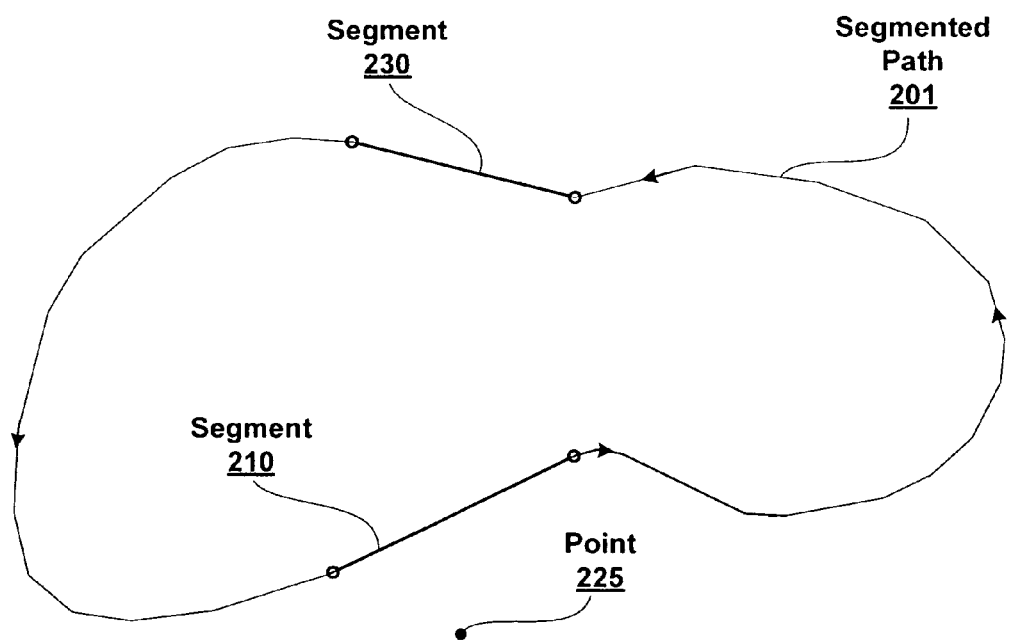
Figure 2E:
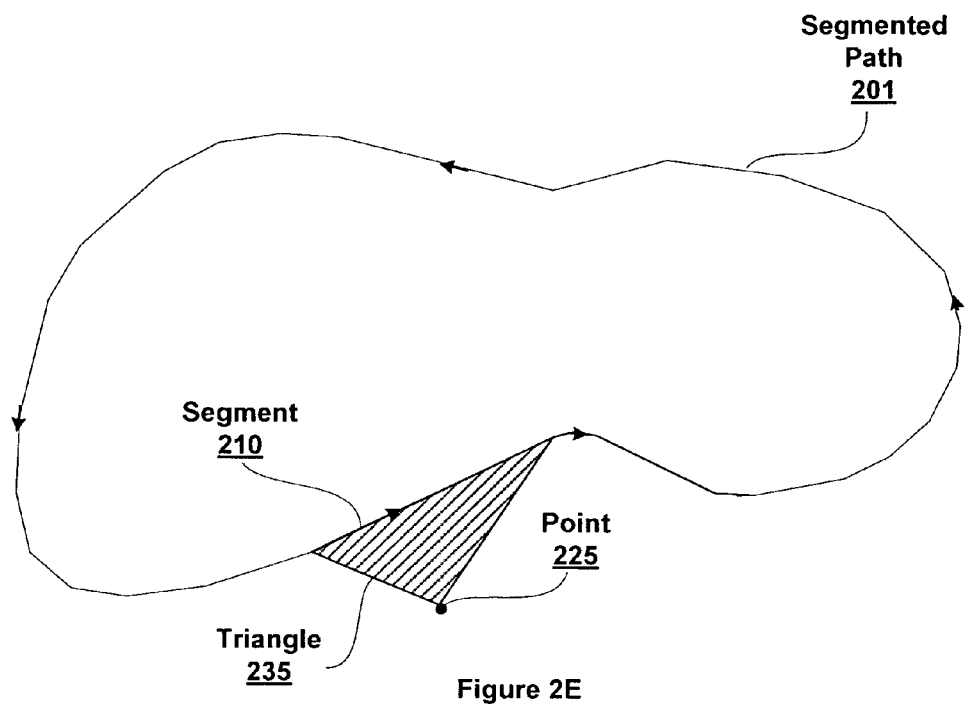
FIGS. 2E and 2F illustrate segments of the two-dimensional path of FIG. 2D that are used to form triangles in accordance with one or more aspects of the present invention.
Figure 2F:
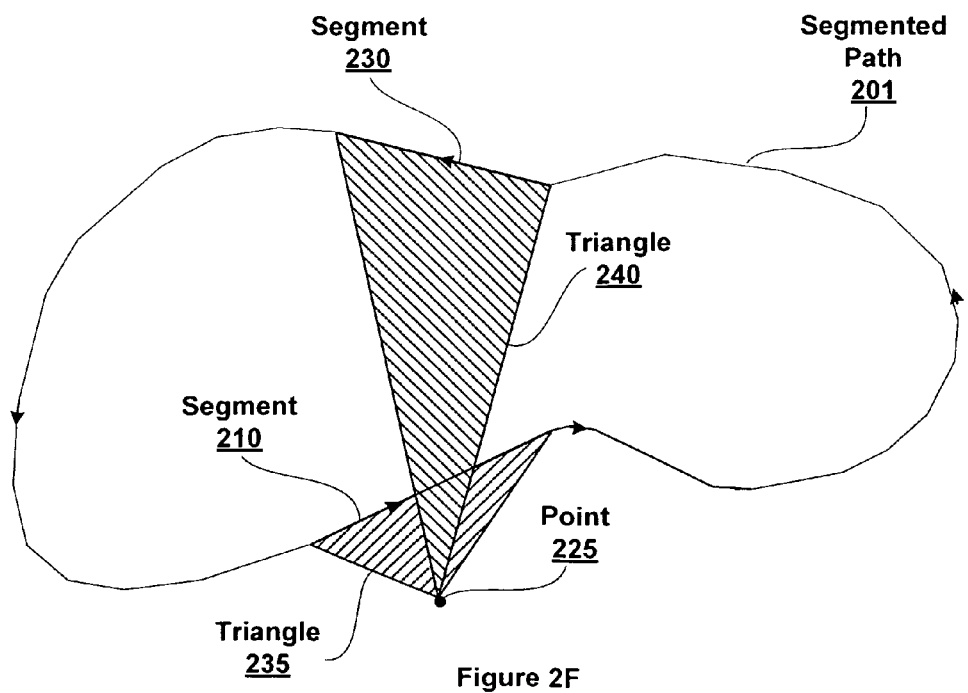

FIG. 2D illustrates segmented path 201 including segments 210 and 230 in accordance with one or more aspects of the present invention. A point in space, point 225, is outside of segmented path 201 (and outside of path 200). Segments 210 and 230 are each used to form triangles with point 225, as shown in FIGS. 2E and 2F. A triangle fan may be generated to produce a triangle for each segment of segmented path 202 and point 225. Because point 225 is positioned outside of segmented path 202, some triangles in the fan will overlap. A winding buffer may be produced by using the triangle fan, as described in conjunction with FIGS. 3A, 3B, 3C, and FIG. 5.

FIG. 2E illustrates using segment 210 of segmented path 201 to form a triangle with point 225 in accordance with one or more aspects of the present invention. Triangle 235, formed by point 225 and segment 210, is outside of segmented path 201 and has a clockwise direction. FIG. 2F illustrates triangle 235 and using segment 230 of segmented path 201 to form another triangle, triangle 240, in accordance with one or more aspects of the present invention. Unlike triangle fans produced using points that lie inside segmented path 201 or along segmented path 201, a triangle fan produced using point 225 includes overlapping triangles, such as triangles 235 and 240. Unlike triangle 235, triangle 240 has a counter-clockwise direction, as specified by the direction of segment 230. A winding buffer may be produced by using the triangle fan, as described in conjunction with FIGS. 3A, 3B, 3C, and FIG. 5. When triangles 235 and 240 are processed, pixels that are within both triangle 235 and triangle 240 are identified as covered by one of the triangles and are then uncovered by the other triangle. After all of the triangles in the triangle fan are processed, the winding buffer indicates which pixels are inside of segmented path 201.

Figure 3A:
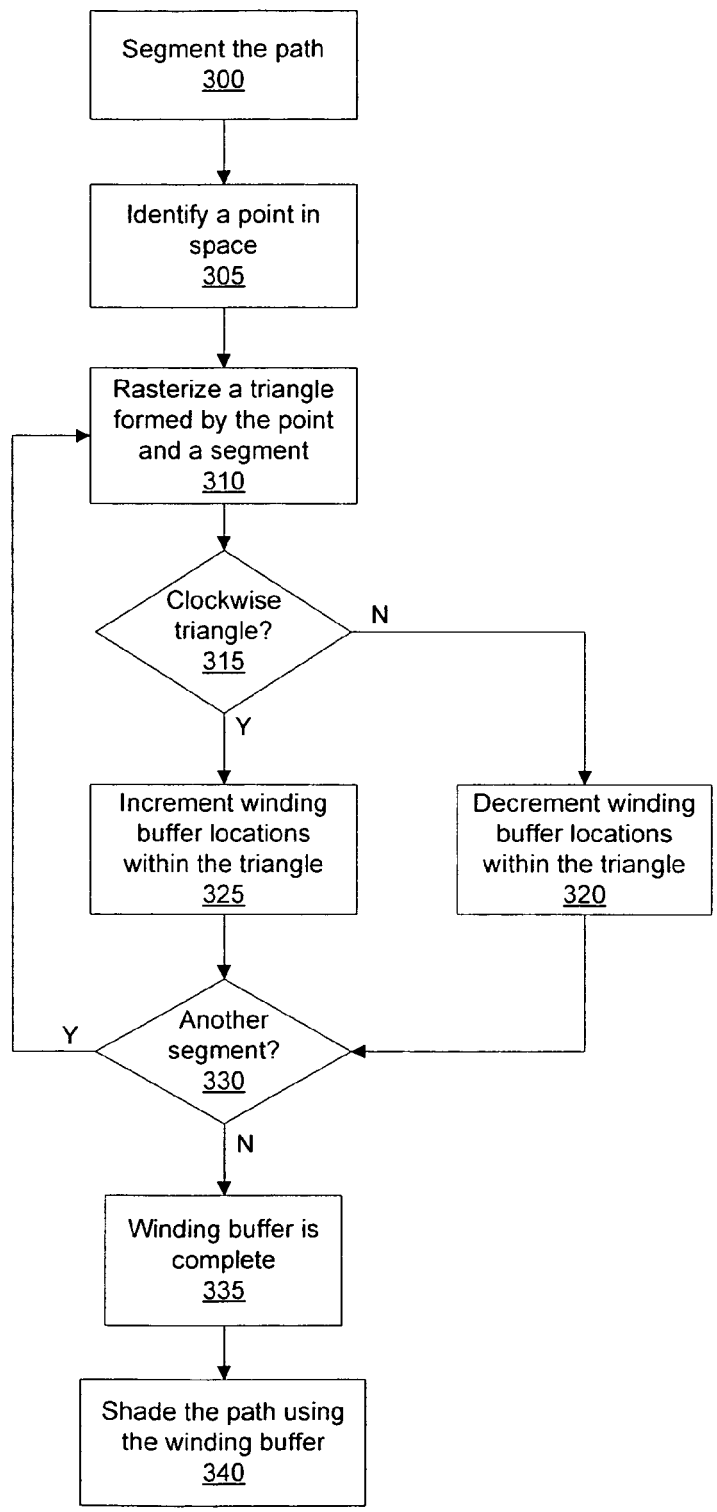
FIGS. 3A, 3B, and 3C illustrate flow diagrams of exemplary methods of producing winding buffers that identify pixels that are inside a path and shading the pixels in accordance with one or more aspects of the present invention.

FIG. 3A illustrates a flow diagram of an exemplary method of producing a winding buffer that identifies pixels that are inside a path and shading those pixels in accordance with one or more aspects of the present invention. In step 300 the path is segmented into a set of segments that approximate the path. As previously explained, path segmentation may be performed using techniques known to those skilled in the art and, in particular, segmentation may be performed by a general purpose processor. In step 305 a point in space is identified. The point may be inside the path, along the path, or outside of the path. The point and the set of segments specify a triangle fan corresponding to the path, where each triangle in the fan is formed by a segment and the point.

In step 310 a triangle formed by the point and one of the segments in the set of segments is rasterized. Step 310 may be performed by a general purpose processor or by a graphics processor that includes a dedicated rasterization engine. In step 315 the method determines if the direction of the triangle is clockwise or counter-clockwise. If, in step 315 the method determines that the triangle is not clockwise, then in step 320 each location in the winding buffer that corresponds to a pixel that is within the triangle is decremented. If, in step 315 the method determines that the triangle is clockwise, then in step 325 each location in the winding buffer that corresponds to a pixel that is within the triangle is incremented. In some embodiments of the present invention, 8 bits may be used to store a (signed) value for each pixel.

In some embodiments of the present invention, the winding buffer is a stencil buffer and locations in the winding buffer are updated, e.g., incremented, decremented, toggled, or the like, using a stencil operation, e.g. add, subtract, xor, or the like. In other embodiments of the present invention, the winding buffer is an alpha buffer and locations in the winding buffer are updated using the triangle direction, e.g., +1 for clockwise, −1 for counter-clockwise, or the like, as an alpha source value for each pixel in the triangle and using an alpha blend mode of addition. In still other embodiments of the present invention, the winding buffer is an accumulation buffer and locations in the winding buffer are updated using accumulation operations, e.g., addition, subtraction, xor, or the like. Furthermore, the winding buffer may store direction values for sub-pixel resolution in order to indicate which sub-pixels are inside the path. Therefore, the winding buffer may be used to produce an anti-aliased image including the shaded path.

In step 330 the method determines if another segment of the set of segments should be processed, and, if so, then the method returns to step 310. If, in step 330 the method determines that all of the segments in the set of segments have been processed, then in step 335 the winding buffer is complete. The winding buffers shown in FIG. 1B or 1D are examples of winding buffers that may be produced using this method. In step 340 the winding buffer may be used to shade (fill) the pixels that are inside of the path. In other embodiments of the present invention, the winding buffer may be used to perform operations on the pixels that are either inside of the path or outside of the path. The winding buffer may also be manipulated to blur or grow the edges of the path, or the winding buffer may be combined with another buffer or mask. In some embodiments of the present invention, the winding buffer is read by a shader program and used to produce shaded pixels for the path.

Figure 3B:
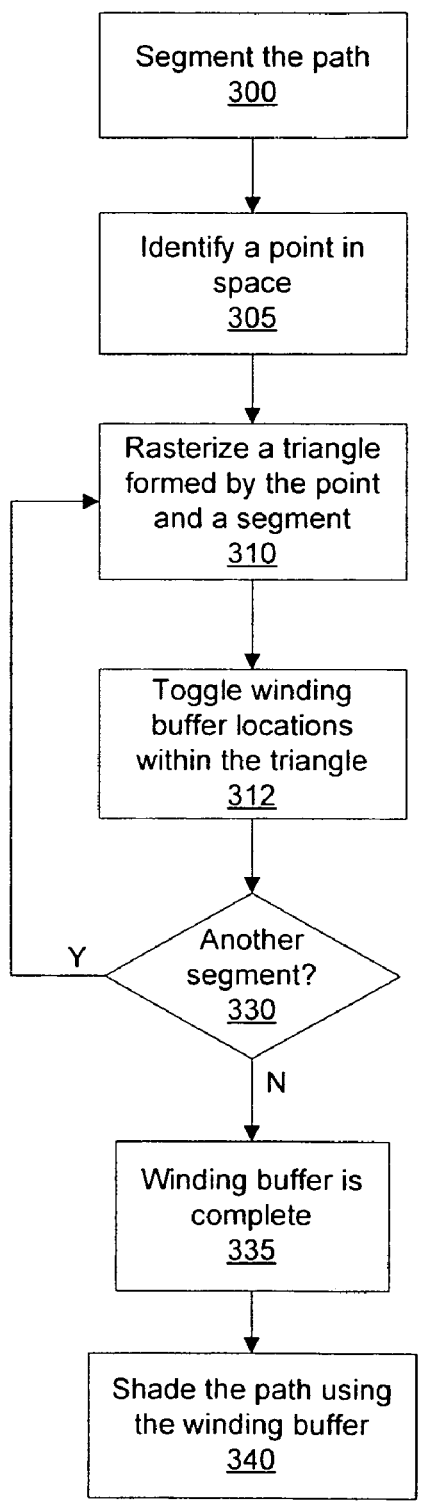

FIG. 3B illustrates a flow diagram of another exemplary method of producing a winding buffer that identifies pixels that are inside a path and shading those pixels, in accordance with one or more aspects of the present invention. Steps 300, 305, and 310 are completed as previously described in conjunction with FIG. 3A. In step 312 each location in the winding buffer that corresponds to a pixel that is within the rasterized triangle is toggled, i.e. a value of 0 becomes a 1 and a value of 1 becomes a zero. This method only requires storing a single bit for each pixel that is represented by the winding buffer. Therefore, the winding buffers shown in FIGS. 2B and 2D cannot be produced using this method. Instead, in FIG. 1B all of the −1 s would be 1s and in FIG. 1D, all of the 2s would be 0s. An advantage of using this method is that the winding buffer is much smaller than a winding buffer that stores multiple bits for each pixel.

Steps 330, 335, and 340 are completed as previously described in conjunction with FIG. 3A. A winding buffer produced for FIG. 1A using this method may be shaded in the same manner as a winding buffer containing multiple bits for each pixel. However, a winding buffer produced for FIG. 1C using this method may not produce the same shading as the winding buffer shown in FIG. 1D since the pixels corresponding to values of 2 in FIG. 2D will have values of 0 and will therefore, appear the same as pixels that are outside of path 110.

Figure 3C:
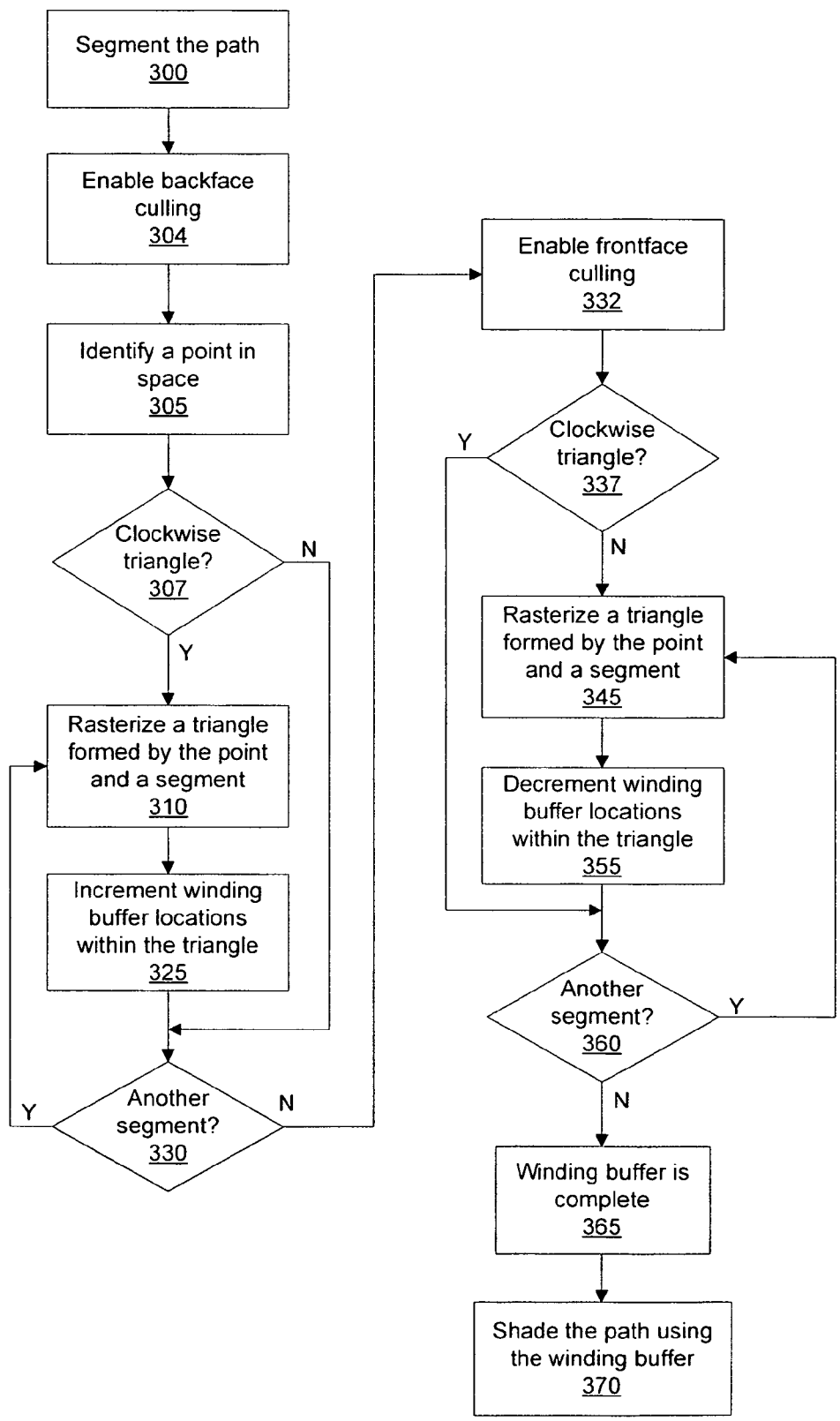

FIG. 3C illustrates a flow diagram of another exemplary method of producing a winding buffer that identifies pixels that are inside a path and shading those pixels, in accordance with one or more aspects of the present invention. This method of the present invention may be used when a "two-sided" stencil buffer is not available, i.e., stencil operations such as increment and decrement cannot be specified for each triangle. In step 300 the path is segmented into a set of segments that approximate the path. In step 304 backface culling is enabled in order to discard all counter-clockwise triangles. Step 305 is completed as previously described in conjunction with FIG. 3A. In step 307 the method determines if the direction of the triangle is clockwise or counter-clockwise. If, in step 307 the method determines that the triangle is not clockwise, then the method proceeds directly to step 330, effectively discarding the triangle. If, in step 307 the method determines that the triangle is clockwise, then in step 310 the triangle formed by the point and one of the segments is rasterized. In step 325 each location in the winding buffer that corresponds to a pixel that is within the triangle is incremented.

In step 330 the method determines if another segment of the set of segments should be processed, and, if so, then the method returns to step 307. If, in step 330 the method determines that all of the segments in the set of segments have been processed, then in step 332 frontface culling is enabled (backface culling is disabled). Enabling frontface culling causes clockwise triangles to be discarded. In step 337 the method determines if the direction of the triangle is clockwise or counter-clockwise. If, in step 337 the method determines that the triangle is clockwise, then the method proceeds directly to step 360, effectively discarding the triangle. If, in step 337 the method determines that the triangle is counter-clockwise, then in step 345 the triangle formed by the point and one of the segments is rasterized. In step 355 each location in the winding buffer that corresponds to a pixel that is within the triangle is decremented.

In step 365 the method determines if another segment of the set of segments should be processed, and, if so, then the method returns to step 337. If, in step 365 the method determines that all of the segments in the set of segments have been processed, then in step 365 the winding buffer is complete. The winding buffers shown in FIG. 1B or 1D are examples of winding buffers that may be produced using this method. Step 340 is completed as previously described in conjunction with FIG. 3A. Persons skilled in the art will appreciate that any system configured to perform the method steps of FIGS. 3A, 3B, and 3C or their equivalents, is within the scope of the present invention.

Figure 4A:
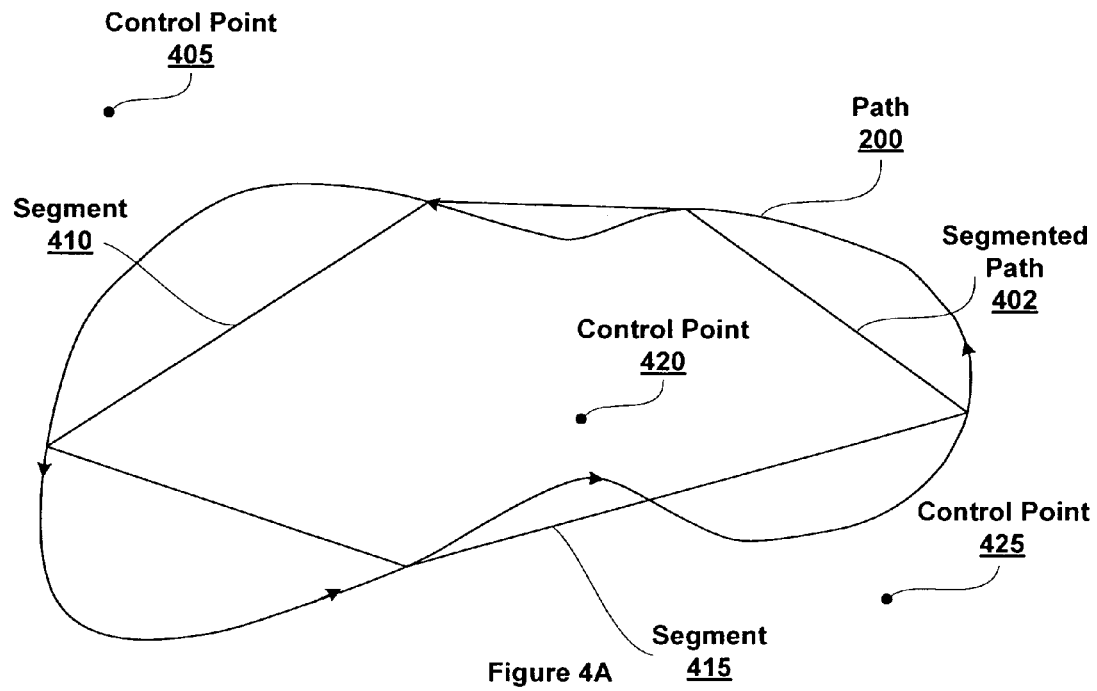
FIG. 4A illustrates a segmented two-dimensional path where each segment includes at least one control point in accordance with one or more aspects of the present invention.

The number of segments used to approximate a path may be reduced by including one or more control points with each segment such that each segment is actually a curve, e.g., a quadratic curve, cubic curve, or the like. Using fewer segments reduces the number of triangles that are processed to produce a winding buffer for the path, and is therefore advantageous. FIG. 4A illustrates path 200 approximated using a set of segments, represented as segmented path 402, where each segment includes at least one control point in accordance with one or more aspects of the present invention. A first portion of path 200, a curve 414, is approximated by segment 410 and control point 405 and a second portion of path 200, a curve 418, is approximated by segment 415 and two control points, control point 420 and control point 425.

Figure 4B:
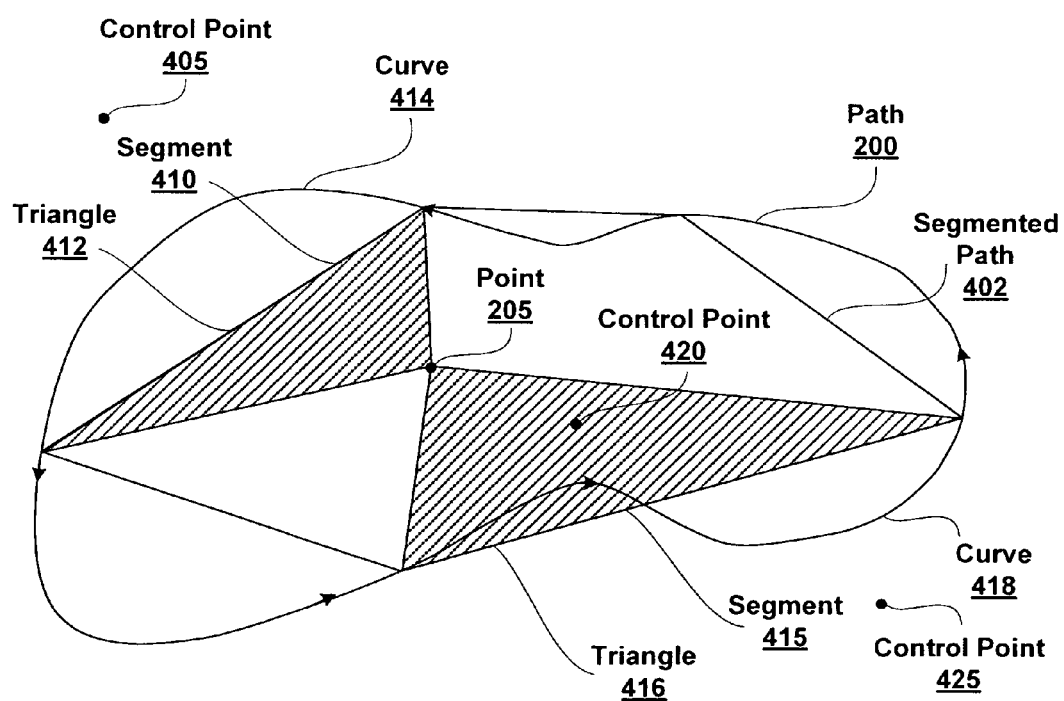
FIG. 4B illustrates triangles formed by a point and two of the segments of FIG. 4A in accordance with one or more aspects of the present invention.

FIG. 4B illustrates triangles formed by a point inside of path 200, point 205, and segments 410 and 415 of FIG. 4A in accordance with one or more aspects of the present invention. A triangle fan may be generated to produce a triangle for each segment of segmented path 402 and point 220. Like a triangle fan that is produced using point 205 of FIG. 2B, all of the triangles in a triangle fan produced using point 220 will be within segmented path 201. The point used to produce the triangle fan, such as point 205, may be positioned inside, along, or outside of segmented path 202.

A first region is bounded by curve 414 and the two edges of triangle 412 that include point 205 as an endpoint. A portion of the first region lies outside of triangle 412 and that portion may be determined using a texture map, as described in conjunction with FIGS. 4C and 5. Similarly, a second region is bounded by curve 418 and the two edges of triangle 416 that include point 205 as an endpoint. Unlike the first region, a portion of triangle 416 is outside of the second region. The portion of triangle 416 that is outside of the second region and the portion of the second region that is outside of triangle 416 may be determined using a texture map, as described in conjunction with FIGS. 4D and 5.

Figure 4C:
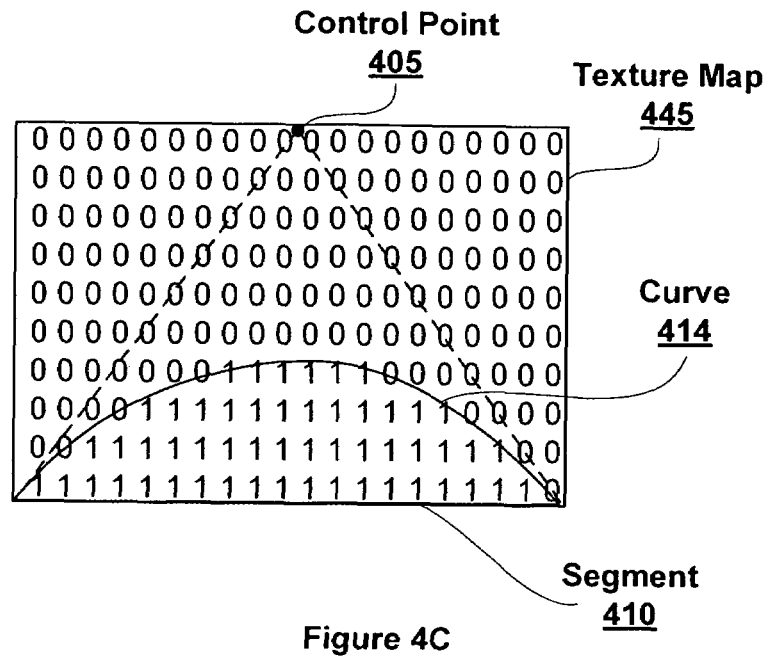
FIGS. 4C and 4D illustrate texture maps defining curves for the two segments of FIG. 4A in accordance with one or more aspects of the present invention.

FIG. 4C illustrates the texture map, texture map 445 that defines curve 414 for segment 410 of FIG. 4A in accordance with one or more aspects of the present invention. In some embodiments of the present invention, texture map 445 may be produced by a graphics processor executing a shader program that evaluates a function, e.g., cubic, quadratic, or the like, specifying curve 414. Texture map 445 is indexed using texture coordinates corresponding to control point 405 and the endpoints of segment 410. Curve 414 is superimposed on texture map 445 in FIG. 4C to illustrate the texels that are within curve 414. The texel values that are within curve 414 may be modified based on the winding direction of triangle 412. For example, when the winding direction of triangle 412 is counter-clockwise the texel values may be inverted to change each +1 to a −1.

Figure 4D:
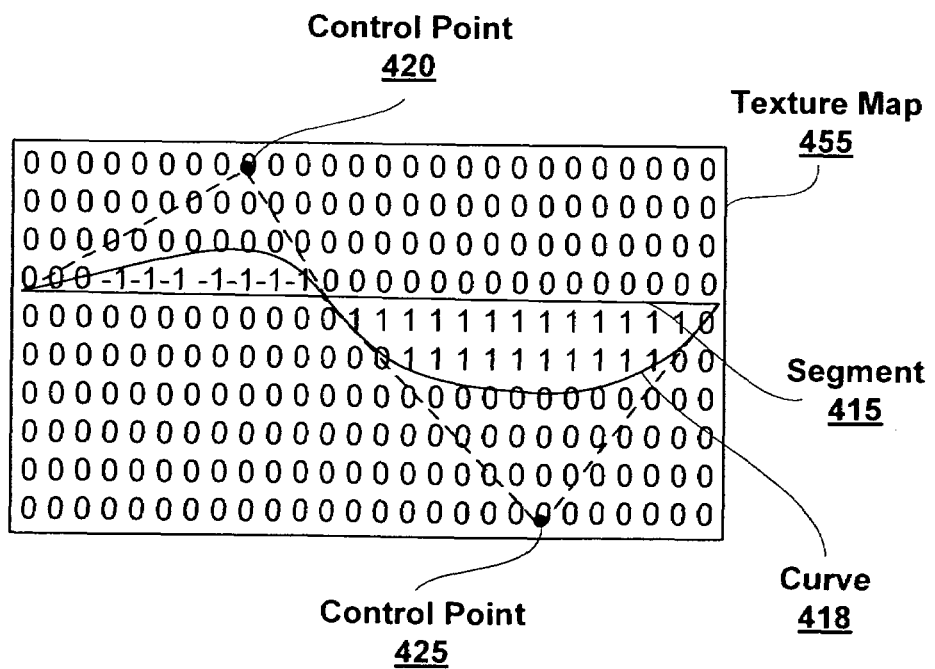

FIG. 4D illustrates the texture map, texture map 455, that defines curve 418 for segment 415 of FIG. 4A in accordance with one or more aspects of the present invention. In some embodiments of the present invention, texture map 455 may be produced by a graphics processor executing a shader program that evaluates a function, e.g., cubic, quadratic, or the like, specifying curve 418. Texture map 455 is indexed using texture coordinates corresponding to control points 420 and 425 and the endpoints of segment 415. Curve 418 is superimposed on texture map 455 in FIG. 4D to illustrate the texels that are within curve 418 and the texels within triangle 416 that are outside of the second region, i.e., texels that are excluded by curve 418. Specifically, the texels that are within curve 418 have values of 1 and the texels that are excluded by curve 418 have values of −1. The texel values that are within curve 418 and excluded by curve 418 may be modified based on the winding direction of triangle 416. For example, when the winding direction of triangle 412 is counter-clockwise the texel values may be inverted to change each +1 to a −1 and to change each −1 to a +1.

Figure 5:
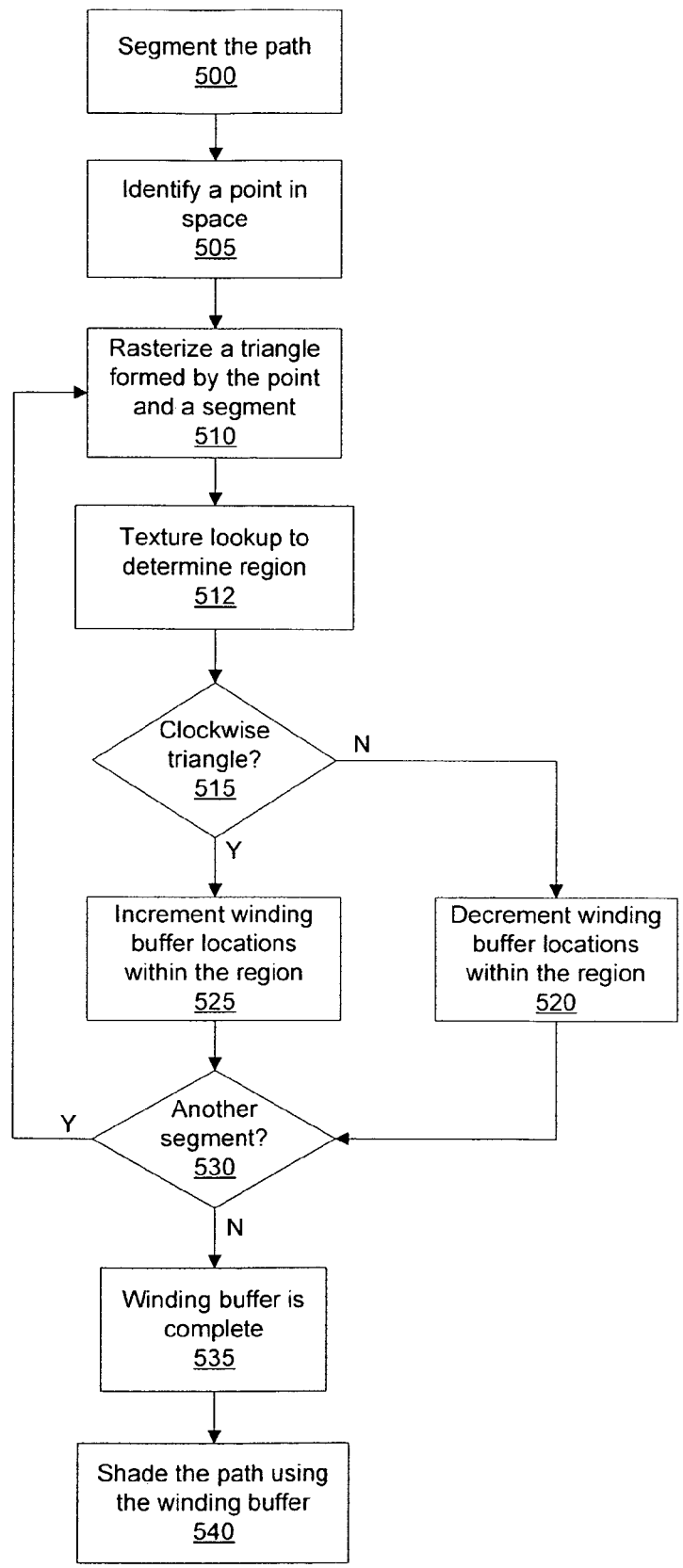
FIG. 5 illustrates a flow diagram of another exemplary method of producing a winding buffer that identifies pixels that are inside a path and shading the pixels in accordance with one or more aspects of the present invention.

FIG. 5 illustrates a flow diagram of another exemplary method of producing a winding buffer that identifies pixels that are inside a path and shading the pixels in accordance with one or more aspects of the present invention. This method may be used to shade paths that are approximated using segments with at least one control point, such as segmented path 402. In step 500 the path is segmented into a set of segments and control points that approximate the path. As previously explained, path segmentation may be performed using techniques known to those skilled in the art and, in particular, segmentation may be performed by a general purpose processor. In step 505 a point in space is identified. The point may be inside the path, along the path, or outside of the path. The point and the set of segments specify a triangle fan corresponding to the path, where each triangle in the fan is formed by a segment and the point.

In step 510 a triangle formed by the point and one of the segments in the set of segments is rasterized. Texture coordinates are assigned to each triangle vertex and control point and per-pixel texture coordinates may be computed during rasterization of the triangle. Step 510 may be performed by a general purpose processor or by a graphics processor that includes a dedicated rasterization engine. In step 512 the method reads a texture map to identify pixels that are within a region formed by the curve corresponding to the segment and the two edges of the triangle that extend from the endpoints of the curve to the point identified in step 505.

In step 515 the method determines if the direction of the triangle is clockwise or counter-clockwise. If, in step 515 the method determines that the triangle is not clockwise, then in step 520 each location in the winding buffer that corresponds to a pixel that is within the region is decremented. If, in step 515 the method determines that the triangle is clockwise, then in step 525 each location in the winding buffer that corresponds to a pixel that is within the region is incremented.

In step 530 the method determines if another segment of the set of segments should be processed, and, if so, then the method returns to step 510. If, in step 530 the method determines that all of the segments in the set of segments have been processed, then in step 535 the winding buffer is complete. In step 540 the winding buffer may be used to shade (fill) the pixels that are inside of the path. In other embodiments of the present invention, the winding buffer may be used to perform operations on the pixels that are either inside of the path or outside of the path. In some embodiments of the present invention, the winding buffer is read by a shader program and used to produce shaded pixels for the path. Persons skilled in the art will appreciate that any system configured to perform the method steps of FIG. 5 or their equivalent, is within the scope of the present invention.

Figure 6:
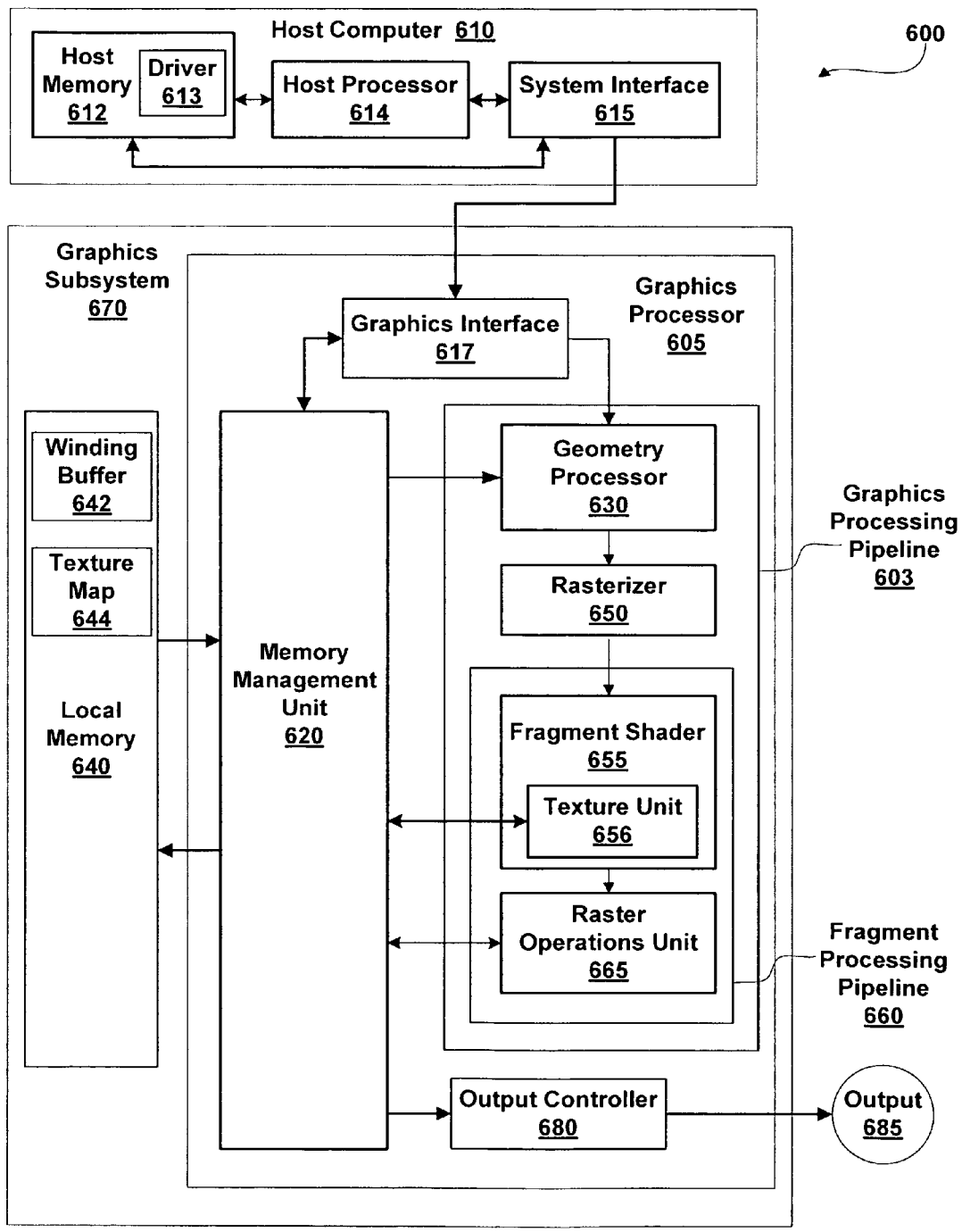
FIG. 6 is a block diagram of a graphics processing system in accordance with one or more aspects of the present invention.

FIG. 6 is a block diagram of an exemplary embodiment of a respective computer system, generally designated 600, and including a host computer 610 and a graphics subsystem 607 in accordance with one or more aspects of the present invention. The methods described in conjunction with FIGS. 3A, 3B, 3C, and 5 may be performed using host computer 610 and graphics subsystem 607. Computing system 600 may be a desktop computer, server, laptop computer, palm-sized computer, tablet computer, game console, portable wireless terminal such as a PDA or cellular telephone, computer based simulator, or the like. Host computer 610 includes host processor 614 that may include a system memory controller to interface directly to host memory 612 or may communicate with host memory 612 through a system interface 615. System interface 615 may be an I/O (input/output) interface or a bridge device including the system memory controller to interface directly to host memory 612. An example of system interface 615 known in the art includes Intel® Northbridge.

Host processor 614 may be configured to perform steps 300 and 305 of FIGS. 3A, 3B, and 3C and steps 500 and 505 of FIG. 5 to produce segmented paths. Host processor 614 may also be configured to determine winding directions of triangles, perform frontface or backface culling, and provide the winding directions to graphics processor 605 for use during generation of the winding buffer.

A graphics device driver, driver 613, interfaces between processes executed by host processor 614, such as application programs, and a programmable graphics processor 605, translating program instructions as needed for execution by programmable graphics processor 605. Driver 613 also uses commands to configure sub-units within programmable graphics processor 605. Specifically, driver 613 may provide programmable graphics processor 605 with sets of segments, produced by host processor 614, that approximate two-dimensional paths.

Graphics subsystem 607 includes a local memory 640 and programmable graphics processor 605. Host computer 610 communicates with graphics subsystem 670 via system interface 615 and a graphics interface 617 within programmable graphics processor 605. Data, program instructions, and commands received at graphics interface 617 can be passed to a graphics processing pipeline 603 or written to a local memory 640 through memory management unit 620. Programmable graphics processor 605 uses memory to store graphics data, including texture maps, and program instructions, where graphics data is any data that is input to or output from computation units within programmable graphics processor 605. Graphics memory is any memory used to store graphics data, including render targets, or program instructions to be executed by programmable graphics processor 605. Graphics memory can include portions of host memory 612, local memory 640 directly coupled to programmable graphics processor 605, storage resources coupled to the computation units within programmable graphics processor 605, and the like. Storage resources can include register files, caches, FIFOs (first in first out memories), and the like.

In addition to Interface 617, programmable graphics processor 605 includes a graphics processing pipeline 603, a memory management unit 620 and an output controller 680. Data and program instructions received at interface 617 can be passed to a geometry processor 630 within graphics processing pipeline 603 or written to local memory 640 through memory management unit 620. In addition to communicating with local memory 640 and interface 617, memory management unit 620 also communicates with graphics processing pipeline 603 and output controller 680 through read and write interfaces in graphics processing pipeline 603 and a read interface in output controller 680.

Within graphics processing pipeline 603, geometry processor 630 and a programmable graphics fragment processing pipeline, fragment processing pipeline 660, perform a variety of computational functions. Some of these functions are table lookup, scalar and vector addition, multiplication, division, coordinate-system mapping, calculation of vector normals, tessellation, calculation of derivatives, interpolation, filtering, and the like. Geometry processor 630 and fragment processing pipeline 660 are optionally configured such that data processing operations are performed in multiple passes through graphics processing pipeline 603 or in multiple passes through fragment processing pipeline 660. Each pass through programmable graphics processor 605, graphics processing pipeline 603 or fragment processing pipeline 660 concludes with optional processing by a raster operations unit 665.

Vertex programs are sequences of vertex program instructions compiled by host processor 614 for execution within geometry processor 630 and rasterizer 650. Shader programs are sequences of shader program instructions compiled by host processor 614 for execution within fragment processing pipeline 660. Geometry processor 630 receives a stream of program instructions (vertex program instructions and shader program instructions) and data from interface 617 or memory management unit 620, and performs vector floating-point operations or other processing operations using the data. The program instructions configure subunits within geometry processor 630, rasterizer 650 and fragment processing pipeline 660. The program instructions and data are stored in graphics memory, e.g., portions of host memory 612, local memory 640, or storage resources within programmable graphics processor 605. When a portion of host memory 612 is used to store program instructions and data the portion of host memory 612 can be uncached so as to increase performance of access by programmable graphics processor 605. Alternatively, configuration information is written to registers within geometry processor 630, rasterizer 650 and fragment processing pipeline 660 using program instructions, encoded with the data, or the like.

Data processed by geometry processor 630 and program instructions are passed from geometry processor 630 to a rasterizer 650. Rasterizer 650 is a sampling unit that processes primitives and generates sub-primitive data, such as fragment data, including parameters associated with fragments (texture identifiers, texture coordinates, winding directions, and the like). Rasterizer 650 converts the primitives, e.g., triangles, into sub-primitive data by performing scan conversion on the data processed by geometry processor 630. In addition to determining the winding direction for each primitive, rasterizer 650 may be configured to perform steps 310 of FIGS. 3A and 3B, steps 304 and 332 of FIG. 3C, and step 510 of FIG. 5. Rasterizer 650 outputs fragment data, including sub-pixel coverage information, winding directions, and shader program instructions to fragment processing pipeline 660.

The shader programs configure the fragment processing pipeline 660 to process fragment data by specifying computations and computation precision. Fragment shader 655 is optionally configured by shader program instructions such that fragment data processing operations are performed in multiple passes within fragment shader 655. Fragment shader 655 may include a texture unit 656 that reads from texture maps stored in graphics memory, such as texture map 644. Texture map 644 may be used to specify a curve function corresponding to a segment, as described in conjunction with FIGS. 4C, 4D, and 5. In particular, texture unit 656 may be configured to perform step 512 of FIG. 5. For example, a winding buffer may be used by fragment shader 655 to complete step 340 of FIGS. 3A and 3B, step 370 of FIG. 3C, and step 540 of FIG. 5. Texture map data may also be applied to the fragment data using techniques known to those skilled in the art to produce shaded fragment data. The texture data may be produced by graphics processor 605 and stored in graphics memory for use during the processing of fragment data.

Fragment shader 655 outputs the shaded fragment data, e.g., winding directions, sub-pixel coverage information, color, depth, and codewords generated from shader program instructions to raster operations unit 665. Raster operations unit 665 includes a read interface and a write interface to memory management unit 620 through which raster operations unit 665 accesses data stored in local memory 640 or host memory 612. Raster operations unit 665 optionally performs near and far plane clipping and raster operations, such as stencil, z test, alpha blending, and the like, using the fragment data and pixel data stored in local memory 640 or host memory 612 at a pixel position (image location specified by x,y coordinates) associated with the processed fragment data. Raster operations unit 665 may be configured to perform steps 320 and 325 of FIGS. 3A and 3C and step 312 of FIG. 3B. Raster operations unit 665 may also be configured to perform steps 355 of FIG. 3C and steps 520 and 525 of FIG. 5. The output data from raster operations unit 665 is written back to local memory 640 or host memory 612 at the pixel position associated with the output data and the results, e.g., winding buffer, image data, or the like are saved in a render target, e.g., stencil buffer, alpha buffer, accumulation buffer, or the like, stored in graphics memory.

When processing is completed, an output 685 of graphics subsystem 607 is provided using output controller 680. Alternatively, host processor 614 reads the image stored in local memory 640 through memory management unit 620, interface 617 and system interface 615. Output controller 680 is optionally configured by opcodes to deliver data to a display device, network, electronic control system, other computing system 600, other graphics subsystem 607, or the like.

The present invention may be used to identify pixels that are inside a two-dimensional path in order to shade the path. The processing workload may be divided between a host processor and a graphics processor to improve the overall system performance for filling two-dimensional paths. For example, the host processor may perform segmentation of the path and the graphics processor may identify pixels that are inside of the path by producing a winding buffer and shade those pixels based on the winding buffer. In order to reduce the number of segments used to approximate a path, at least one control point may be used to define each segment as a curve. The curve function may be specified as a texture map that is used to produce the winding buffer.

While the foregoing is directed to embodiments of the present invention, other and further embodiments of the invention may be devised without departing from the basic scope thereof, and the scope thereof is determined by the claims that follow. The foregoing description and drawings are, accordingly, to be regarded in an illustrative rather than a restrictive sense. The listing of steps in method claims do not imply performing the steps in any particular order, unless explicitly stated in the claim.

All trademarks are the respective property of their owners.

The invention claimed is:

1. A method of identifying pixels that are inside a two-dimensional path to produce a winding buffer, comprising:
    segmenting the path into a set of segments that approximate the two-dimensional path to produce a segmented two-dimensional path;
    identifying a point in space that lies outside of a portion of the space that is enclosed by and includes the segmented two-dimensional path;
    forming a triangle that includes a first segment of the set of segments as a first edge, a second edge formed by the point in space and a first endpoint of the first segment, and a third edge formed by the point in space and a second endpoint of the first segment; and
    determining a winding direction of the triangle;
    storing the winding direction in the winding buffer, wherein the winding buffer indicates identifies the pixels that are inside of the two-dimensional path; and
    accessing the winding buffer to produce an image that is suitable for display.

2. The method of claim 1, further comprising updating the winding buffer for each pixel that is within the triangle based on the winding direction of the triangle.

3. The method of claim 2, wherein the step of updating comprises incrementing locations in the winding buffer corresponding to each pixel that is within the triangle when the winding direction is clockwise and decrementing the locations when the winding direction is counter-clockwise.

4. The method of claim 2, wherein the step of updating comprises incrementing locations in the winding buffer corresponding to each pixel that is within the triangle when the winding direction is counter-clockwise and decrementing the locations when the winding direction is clockwise.

5. The method of claim 2, wherein the winding buffer includes only one bit for each pixel.

6. The method of claim 2, wherein the step of updating comprises toggling locations in the winding buffer corresponding to each pixel that is within the triangle.

7. The method of claim 2, wherein the steps of forming, determining, and updating are repeated for each remaining segment within the set of segments to produce the winding buffer that identifies the pixels that are inside the two-dimensional path.

8. The method of claim 2, further comprising shading pixels that correspond to locations in the winding buffer that are non-zero.

9. The method of claim 2, further comprising shading pixels that correspond to locations in the winding buffer that include odd values.

10. The method of claim 2, further comprising enabling backface culling, and wherein the step of updating comprises incrementing locations in the winding buffer corresponding to each pixel that is within the triangle when the winding direction indicates that the triangle is frontfacing.

11. The method of claim 7, wherein additional triangles are formed for each remaining segment and a first one of the additional triangles overlaps with at least a portion of a second one of the additional triangles.

12. The method of claim 7, wherein the path is a self-intersecting two-dimensional path.

13. The method of claim 1, further comprising:
    specifying a control point corresponding to the first segment, the control point defining a curve between the first endpoint and the second endpoint; and
    updating the winding buffer for each pixel that is within a region bounded by the curve, the second edge, and the third edge, wherein the updating is based on the winding direction of the triangle.

14. The method of claim 13, wherein a texture map provides a mask indicating a shape of the curve based on the control point.

15. The method of claim 1, further comprising rasterizing the triangle and producing sub-pixel coverage information for a pixel that is at least partially covered by the triangle.

16. A system for shading pixels that are inside a two-dimensional path, comprising:
    a rasterizer configured to rasterize pixels within a triangle bounded by a segment of the two-dimensional path and a point in space and to determine a winding direction of the triangle, wherein the point in space lies outside of a portion of the space that is enclosed by and includes the two-dimensional path;
    a fragment processing pipeline coupled to the rasterizer and configured to update a winding buffer based on the winding direction of the triangle and configured to read the winding buffer and to shade the pixels that are inside of the two-dimensional path; and a memory coupled to the fragment processing pipeline and configured to store the winding buffer that indicates the pixels that are inside of the two-dimensional path.

17. The system of claim 16, wherein the fragment processing pipeline comprises a raster operations unit configured to perform stencil operations to update the winding buffer for each pixel within the triangle based on the winding direction.

18. The system of claim 16, wherein the fragment processing pipeline comprises a raster operations unit configured to perform alpha blending to update the winding buffer for each pixel within the triangle based on the winding direction.

19. The system of claim 16, wherein the fragment processing pipeline comprises a texture unit configured to read a texture map that defines a curve, wherein the curve and the point bound a region, and the fragment shader is further configured to update the winding buffer for each pixel within the region based on the winding direction of the triangle.

20. The system of claim 16, further comprising a host processor coupled to the rasterizer and configured to determine a set of segments that includes the segment and approximates the two-dimensional path.

\* \* \* \* \*